United States Patent [19]
McDougald

[11] Patent Number: 4,863,256
[45] Date of Patent: Sep. 5, 1989

[54] EYEGLASSES WITH INVERTABLE LENS CARRIERS

[76] Inventor: Otis C. McDougald, 9138 Parnell St., Covington, Ga. 30209

[21] Appl. No.: 197,350

[22] Filed: May 23, 1988

[51] Int. Cl.⁴ .............................................. G02C 7/06
[52] U.S. Cl. ........................................ 351/54; 351/84
[58] Field of Search ............................. 351/54, 84, 59

[56] References Cited
FOREIGN PATENT DOCUMENTS
423478 4/1911 France .................................. 351/54

Primary Examiner—Rodney B. Bovernick
Attorney, Agent, or Firm—James B. Middleton

[57] ABSTRACT

A pair of eyeglasses has a frame with hubs at each side of the frame, and a lens carrier rotatably mounted in the hubs to allow the lenses to be rotated slightly to adjust the pantoscopicity or to be rotated 180° to invert multifocal lenses. The lens carrier may have studs extending laterally to be received through the hubs, and fixed by a nut, the lens carrier may include a frame for the lenses, the frame being freely rotatable on a pin extending from the hub. A spring latch then, locks the lens carrier to the frame to prevent rotation. The lens carrier can therefore be inverted and latched.

8 Claims, 1 Drawing Sheet

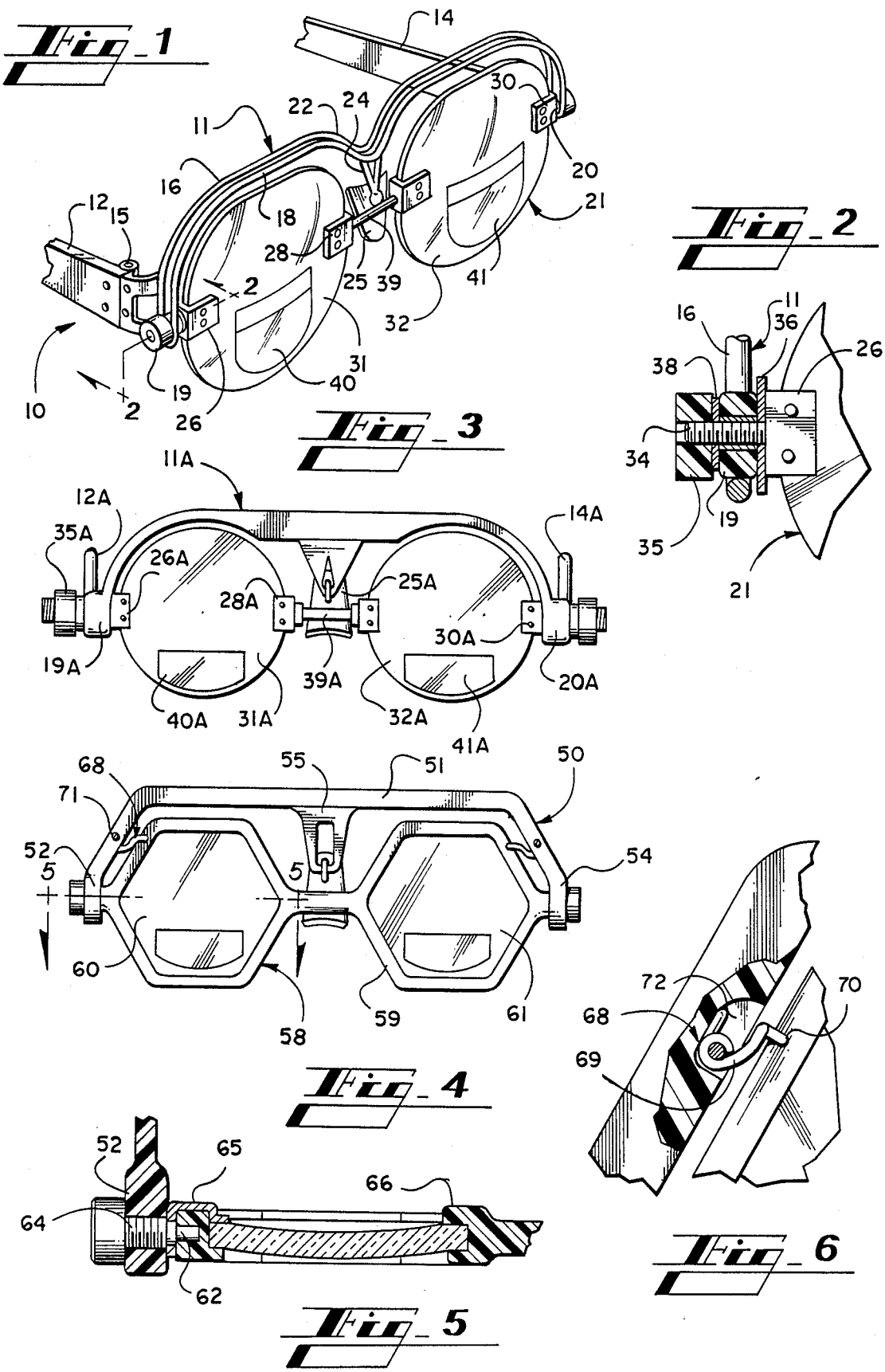

EYEGLASSES WITH INVERTABLE LENS CARRIERS

Eyeglasses frequently contain lenses that have two or more areas with different focal lengths. It is of course quite common that a person with some degree of ametropia when young requires a second focal length for close work as the person ages. One normally thinks of close work as including reading, needlework and the like, so that the lens area for close work is customarily at the bottom of the lens as a whole. There are some activities, however, wherein close work is above one's head rather than below, so that the lens for the close work ought to be at the top of the lens as a whole rather than at the bottom.

In the past, there has been some effort at providing means for inverting a multifocal lens so the near vision lens can be either at the top or at the bottom, at the will of the wearer. Such prior art is shown in the U.S. Pat. Nos. 1,381,603 to Updegrave et al., and 2,285,615 to Ruchser. In both these patents, the arrangement is that the entire eyeglasses are simply inverted, along with the nose pads, temple pieces and the like.

There has also been some effort at providing eyeglass frames wherein the nose pads and temple pieces remain relatively fixed, while the lens carriers pivot with respect to the frame. This arrangement is disclosed in U.S. Pat. Nos. 868,857 issued to Garner, and 3,990,788 issued to Choy.

The prior art does not include a simple and comfortable eyeglass frame having lens carriers that are easily invertable.

SUMMARY OF THE INVENTION

This invention relates generally to eyeglasses, and is more particularly concerned with eyeglasses having lens carriers invertable with respect to the eyeglass frame.

The present invention provides a frame for eyeglasses, the frame including an upper support member having a depending nose pad assembly. The outer extremities of the support member carry generally conventional temple pieces. Carried by the support member, there is a lens carrier that is selectively rotatable with respect to the support member. The lens carrier is selectively rotatable so that the lenses can be angled slightly for adjusting the pantoscopicity, or can be fully rotated to place the near-vision area of the lens at the top or bottom of the lens as desired.

In one embodiment of the invention, the lenses are easily removable from the lens carrier so a person can exchange frames to vary the color or the like while having only one pair of lenses.

BRIEF DESCRIPTION OF THE DRAWINGS

These and other features and advantages of the present invention will become apparent from consideration of the following specification when taken in conjunction with the accompanying drawings in which:

FIG. 1 is a perspective view of a pair of eyeglasses made in accordance with the present invention, portions of the temple pieces being broken away;

FIG. 2 is an enlarged cross-sectional view taken substantially along the line 2—2 in FIG. 1;

FIG. 3 is a front elevational view of a modified form of eyeglasses made in accordance with the present invention;

FIG. 4 is a front elevational view of another modified form of the present invention;

FIG. 5 is an enlarged cross-sectional view taken substantially along the line 5—5 in FIG. 4; and, FIG. 6 is an enlarged, fragmentary view showing a detail of the embodiment of the invention illustrated in FIGS. 4 and 5.

DETAILED DESCRIPTION OF THE EMBODIMENT

Referring now more particularly to the drawings, and to those embodiments of the invention here presented by way of illustration, FIG. 1 shows a frame generally designated at 10, the frame 10 including a laterally disposed support member 11 and rearwardly extending temple pieces 12 and 14. The temple pieces 12 and 14 may be appropriately hinged as at 15 so the temple pieces can be folded for convenient storage of the eyeglasses.

The support member 11 is illustrated as being formed of a wire-like member and including a rear wire 16 and a front wire 18. These two wires 16 and 18 are joined to a hub 19 adjacent to the temple piece 12 and a hub 20 adjacent to the temple piece 14. As will be iscussed below, the hubs 19 and 20 rotatably support the lens carrier generally designated at 21.

Generally centrally of the support member 11, the members 16 and 18 curve downwardly as at 22, and carry a depending nose pad support 24. The nose pad support 24 in turn carries the nose pad 25. Though the nose pad 25 is here shown as a generally solid member for engaging the front portion of a person's nose, it will be well understood by those skilled in the art that any form of conventional nose pad or the like can be utilized with the eyeglasses of the present invention.

With attention to FIGS. 1 and 2, it will be seen that the lens carrier 21 is here shown as including clevises 26, 28, 29 and 30. These clevises are fixed to the lenses themselves so there is no additional frame member for the lenses 31 and 32. Fixed to, and extending from, the clevis 26, there is a stud 34. The stud 34 extends through an appropriate opening in the hub 19, and receives a nut 35 at the extending end thereof. As is best shown in FIG. 2, there may be washers 36 and 38 on each side of the hub 19, and at least one of these washers may be a locking type washer to prevent inadvertent loosening of the nut 35. The clevis 30 adjacent to the hub 20 is formed in precisely the same manner as the one just described, and the description will not be repeated.

Between the two lenses 31 and 32, the clevises 28 and 29 have a shaft 39 extending therebetween. It will therefore be seen that the lens carrier 21 is made up of the four clevises with the shaft 39 between the inner clevises, while the outer clevises are held by studs such as the stud 34 rotatable in the hubs 19 and 20.

With the above discussion in mind, it will be readily understood that the lens carrier is selectively rotatable as desired. The nuts such as the nut 35 can be loosened, allowing the lens carrier 21 to be rotated. If the lens carrier is to be rotated only slightly for improved pantoscopicity, the nuts will be loosened, the lenses tilted slightly, and the nuts 35 retightened. If the lenses are to be completely inverted so that the wearer can have the near vision portions 40 and 41 adjacent to the top of the eyeglasses rather than the bottom, the nuts such as the nut 35 will be loosened, the lens carrier 21 rotated 180°, and the nut 35 retightened. During the rotation of the lens carrier 21, it will be understood that the temple pieces 12 and 14 remain precisely the same, and the nose pad 25 remains precisely the same. Thus, once the eyeglasses are adjusted to fit one person, the principal frame structure remains the same, while the lens carrier is varied with respect to the frame member.

FIG. 3 of the drawings discloses a different embodiment of the present invention, though the embodiment is quite similar to the one illustrated in FIGS. 1 and 2 of the drawings. In FIG. 3, the support member is designated at 11A, and is formed of a generally solid member that merges with the hubs 19A and 20A. The clevises 26A, 28A, 29A and 30A are fixed to the lenses 31A and 32A as before, so the lens carrier 21A is rotatable with respect to the support member 11A. Since the construction and operation of the eyeglasses shown in FIG. 3 are very similar to that shown in FIGS. 1 and 2, the complete description will not be repeated. Reference numerals for FIG. 3 are the same as for FIGS. 1 and 2, but with an A suffix.

Attention is next directed to FIG. 4 of the drawings. In FIG. 4, the eyeglasses include a support member 51 having integrally formed hubs 52 and 54 at each end thereof. Generally centrally, there is a nose pad support 55 carrying a nose pad 56. A lens carrier 58 includes a frame 59 having lenses 60 and 61.

Looking at FIGS. 4 and 5, it will be noted that, in the embodiment shown in FIGS. 4 and 5 the lens carrier 58 is rotatable about a pin 62 at the end of a stud 64, the stud 64 being threadedly received in the hub 52. Because of this arrangement, it will be understood that the lens carrier 58 is easily rotatable at all times, and the rotation cannot be prevented by tightening the stud 64.

An important feature of the embodiment of the invention shown in FIGS. 4 and 5 is the means for removing the lenses 60 and 61. As is shown in FIG. 5, the stud 64 can be removed from the hub 52 by rotation of the stud 64 by means of the convenient head. When the stud 64 is removed, the pin 62 will be removed from the lens carrier 58 so that the lens carrier 58 is removable from the frame 50. Also, the clip 65 is held in place because it is between the lens carrier 58 and the journal member 52, with the stud 64 passing therethrough. The clip 65 is, as will be seen in FIG. 5, the means for retaining the lens 60 in position. The opposite side of the lens 60 is here shown as being received under a finger 66.

To prevent inadvertent rotation of the lens carrier 58, there is a latch generally designated at 68. The latch 68 is carried by the frame 50 and selectively engages the lens carrier 58. Thus, the lens carrier 58 will normally be held against inadvertent rotation, but is releasable to allow the lens frame 58 to be inverted as desired.

Looking at FIG. 6, it will be seen that the latch 68 includes a spring member 69 having a gripping member 70 for engaging frame 59 of the lens carrier 58. The spring 69 coils around a screw 71 to retain the spring 69 within the cavity 72.

It will therefore be understood that the eyeglasses shown in FIGS. 4, 5 and 6 of the drawings provides a very simple arrangement whereby the lens carrier 58 can be readily inverted to dispose the near vision portion of the lens either at the top or bottom as desired. The latch 68 easily locks the lens carrier 58 in the desired position while allowing the lens carrier to be easily removed. To remove the lens carrier 58, the studs such as the stud 64 will be screwed outwardly to the point that the pins such as the pin 62 are removed from the lens carrier. The lens carrier can then be exchanged, the lenses can be exchanged, and the lens carrier can be easily reinstalled into the frame member 50

From the foregoing discussion, it will be understood that the present invention provides eyeglasses wherein the lenses are easily invertable, or positionable at various angles with respect to the person's eyes. For close work that is above one's normal eye level, the lenses might be inverted. Realizing that the person will then be looking through the lenses backwards, so that the usual broad field of view is not available, the lens carrier can be placed at the precise angle to yield the maximum field of vision. In the embodiment disclosed in FIGS. 4–6 of the drawing, a person can have eyeglass frames to match a wardrobe or the like, and the lenses can be easily moved from one pair of frames to another so the person will not have to make a large investment in the corrective lenses.

It will of course be understood that the particular embodiments of the invention here presented are by way of illustration only, and are meant to be in no way restrictive; therefore, numerous changes and modifications may be made, and full use of equivalents resorted to, without departing from the spirit or scope of the invention as outlined in the appended claims.

I claim:

1. A pair of eyeglasses, comprising a frame to be received on a wearer's face, and a lens carrier for receiving lenses, said lens carrier being carried by said frame for disposing lenses before the eyes of the wearer, said frame including a lateral support receivable above the eyes of the wearer, a pair of hubs carried by said lateral support, one hub of said pair of hubs being at each end of said lateral support, a nose pad depending from said lateral support generally centrally thereof for engaging the nose of the wearer for supporting said lateral support, and a pair of temple pieces extending rearwardly from said lateral support, said lens carrier including a pair of lenses, a shaft extending between said pair of lenses, said shaft being adjacent to said nose pad so that said lenses are rotatable as a unit, and pintle means extending between said lens carrier and said pair of hubs for rotatably mounting said lens carrier to said frame, said pintle means being located generally at the center of said lens carrier so that said lens carrier is rotatable at least 180 degrees with respect to said frame to invert said lenses with respect to the eyes of the wearer.

2. A pair of eyeglasses as claimed in claim 1, said pintle means including a stud fixed to and extending from said lens carrier, said hub defining a journal for said stud, and means for selectively fixing said stud with respect to said hub.

3. A pair of eyeglasses, comprising a frame to be received on a wearer's face, and a lens carrier for receiving lenses, said lens carrier being carried by said frame for disposing lenses before the eyes of the wearer, said frame including a lateral support, a pair of hubs fixed to said lateral support, one hub of said pair of hubs being at each end of said lateral support, a nose pad depending from said lateral support generally centrally thereof, and a pair of temple pieces extending rearwardly from said lateral support, said lens carrier including a pair of lenses, a shaft extending between said pair of lenses, adjacent to said nose pad, and pintle means extending between said lens carrier and said pair of hubs for rotatably mounting said lens carrier to said frame, said pintle means being located generally at the center of said lens carrier so that said lens carrier is rotatable at least 180 degrees with respect to said frame to invert said lenses with respect to the eyes of the wearer, said pintle means including a stud fixed to and extending from said lens carrier, said hub defining a journal for said stud, and means for selectively fixing said stud with respect to said hub, wherein said stud is provided with external threads, said means for selectively fixing said stud with respect to said hub comprising a nut threadedly received on said stud beyond said hub.

4. A pair of eyeglasses as claimed in claim 3, said shaft extending between said lenses being axially aligned with said studs.

5. A pair of eyeglasses, comprising a frame to be received on a wearer's face, and a lens carrier for receiving lenses, said lens carrier being carried by said frame for disposing lenses before the eyes of the wearer, said frame including a lateral support, a pair of hubs fixed to said lateral support, one hub of said pair of hubs being at each end of said lateral support, a nose pad depending from said lateral support generally centrally thereof, and a pair of temple pieces extending rearwardly from said lateral support, said lens carrier including a pair of lenses, a shaft extending between said pair of lenses, adjacent to said nose pad, and pintle means extending between said lens carrier and said pair of hubs for rotatably mounting said lens carrier to said frame, said pintle means being located generally at the center of said lens carrier so that said lens carrier is rotatable at least 180 degrees with respect to said frame to invert said lenses with respect to the eyes of the wearer, said pintle means comprising a screw threadedly receivable through said hub, a pin defined at the inner end of said screw and receivable by said lens carrier so that said lens carrier is rotatable about said pin, and latch means for selectively preventing rotation of said lens carrier with respect to said frame.

6. A pair of eyeglasses as claimed in claim 5, said latch means including a spring carried by said frame, a gripping member carried by said spring and selectively engageable with said lens carrier.

7. A pair of eyglasses as claimed in claim 6, said lens carrier including frames for said lenses, said shaft extending between said lenses being formed integrally with said frames for said lenses, said gripping member being engageable with one of said frames for said lenses.

8. A pair of eyeglasses as claimed in claim 7, and further including clip means for retaining said lenses in said frames for said lenses, said clip means held in place by said pin receivable by said lens carrier, the arrangement being such that removal of said screw allows removal of said clip means and consequent removal of said lenses from said frames for said lenses.

* * * * *